Patented Nov. 13, 1928.

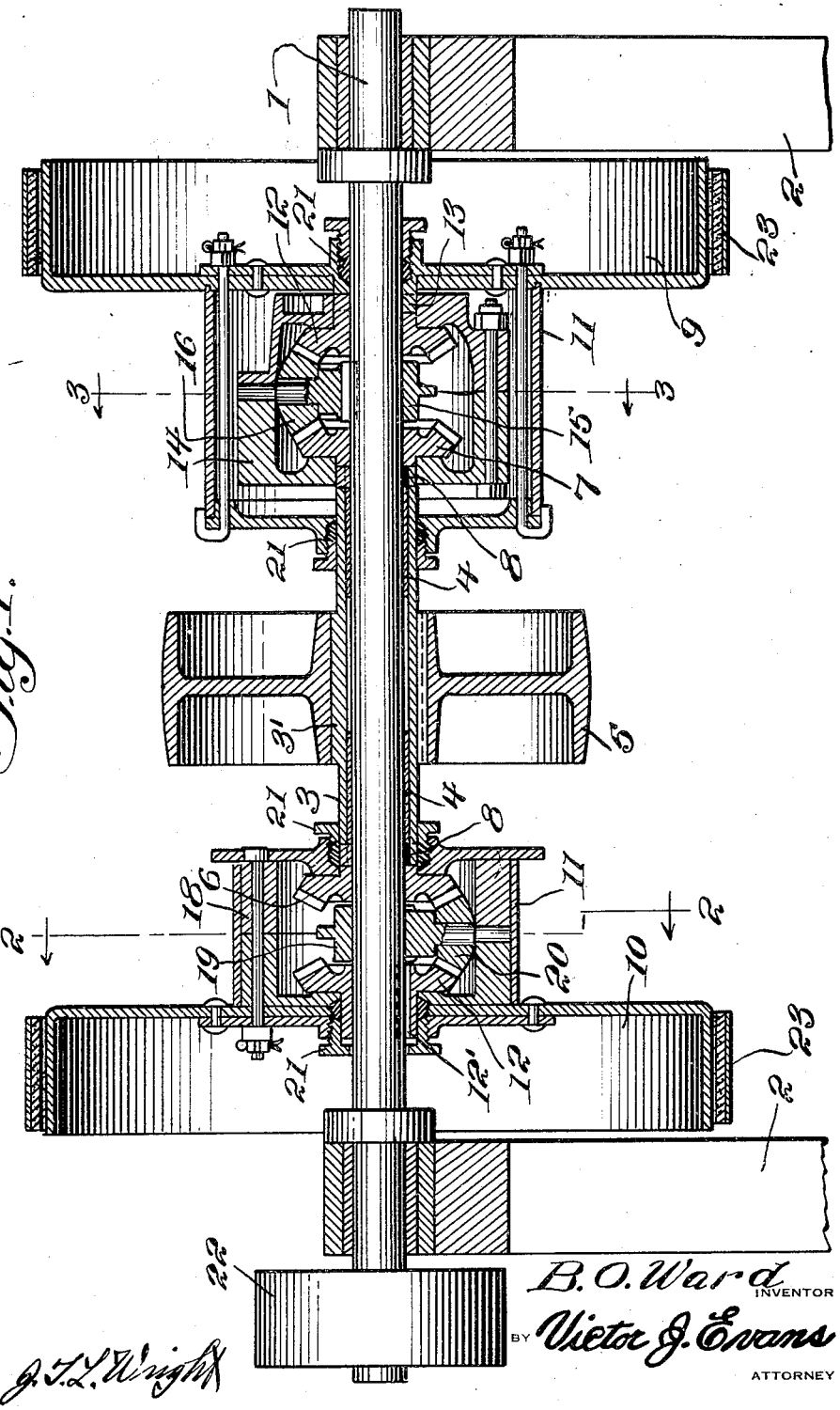

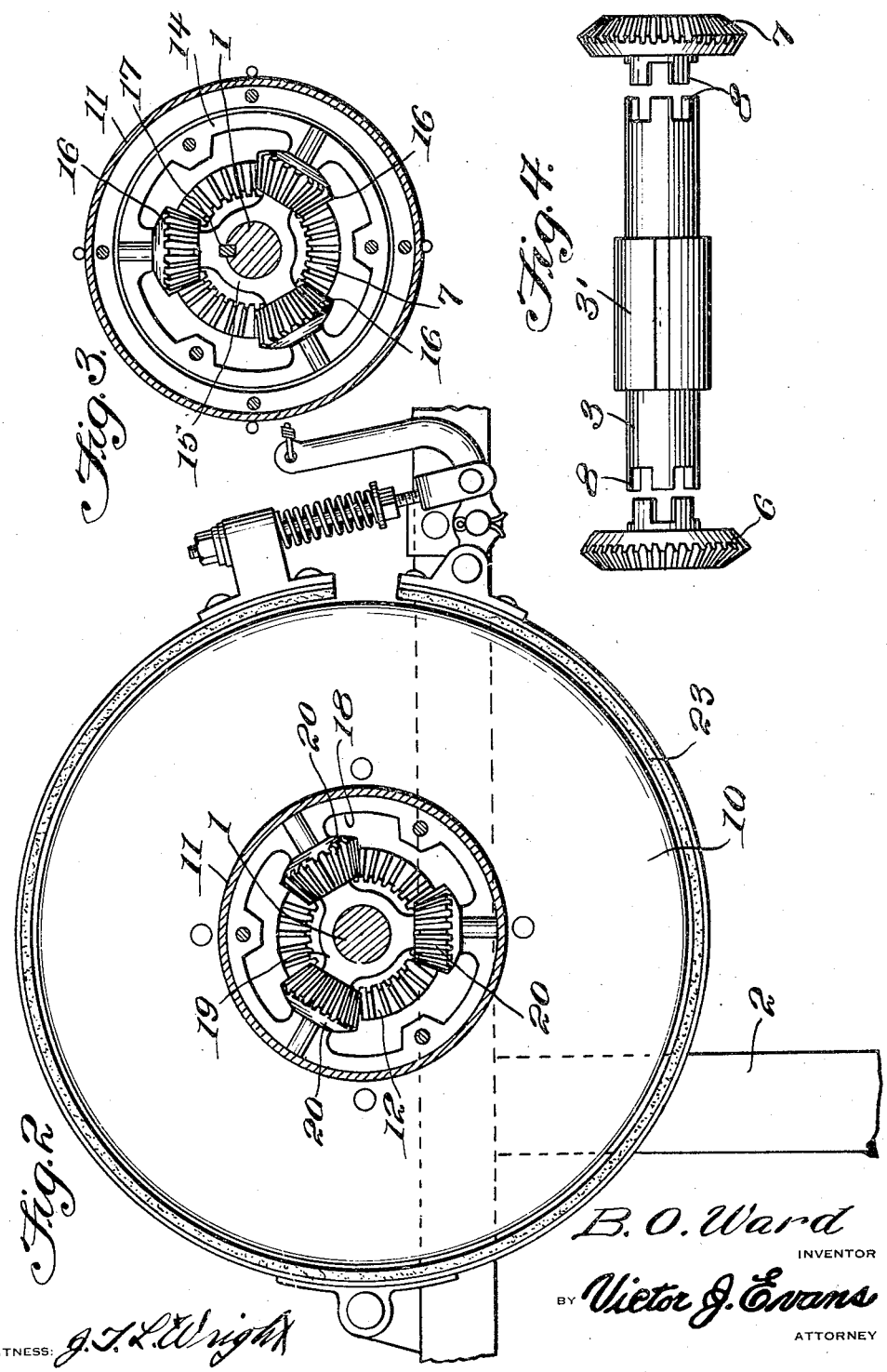

1,691,834

UNITED STATES PATENT OFFICE.

BENJAMIN O. WARD, OF CHEOAH, NORTH CAROLINA.

POWER-TRANSMISSION MEANS.

Application filed May 25, 1928. Serial No. 280,587.

This invention relates to power transmission means, the general object of the invention being to provide means whereby the driven member may be driven in one direction at half speed and in an opposite direction at full speed, the device being useful in operating saw mill carriages and the like whereby the carriage can be moved forwardly at half speed and rearwardly at full speed.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal sectional view through the invention.

Figure 2 is a section on line 2—2 of Figure 1.

Figure 3 is a section on line 3—3 of Figure 1.

Figure 4 is a view of the hollow shaft and its gears to which the central pulley is attached.

In these drawings, the numeral 1 indicates a shaft which has its ends journaled in the uprights 2. A hollow shaft 3 is rotatably mounted on the central part of the shaft 1 through means of the bushings 4 and a pulley 5 is keyed to a central enlargement 3' on said hollow shaft. Beveled pinions 6 and 7 are connected with the ends of the hollow shaft by the teeth 8, the shaft 1 passing through these pinions, as shown in Figure 1. Brake drums 9 and 10 are rotatably mounted on the shaft 1, these drums being placed adjacent the inner sides of the uprights 2 and a housing 11 is attached to the inner face of each drum by bolts or the like.

A beveled pinion 12 is arranged in each housing and one of these pinions is connected with a part of the drum 9 by the teeth 13 which are the same as the teeth 8 and the other pinion is keyed to the shaft 1, as shown at 12'. These pinions 12 are of the same size as the pinions 6 and 7 and are oppositely arranged to said pinions and are spaced therefrom. A casing 14 is placed in the housing of the drum 9 and is rotatably mounted on the shanks of the pinions 7 and 12 in said housing, this casing enclosing the pinions 7 and 12 and a spider 15 is arranged in the casing 14 and is suitably connected therewith so that it will rotate with the casing. This spider carries a number of beveled pinions 16 which mesh with the pinions 7 and 12 and the spider is keyed to the shaft 1, as shown at 17.

A casing 18 is arranged in the housing 11 of the drum 10 and this casing is connected with the housing and the drum so that it must rotate with these parts. A spider 19 is arranged in the casing 18 and is suitably connected therewith, but this spider is not keyed to the shaft. The spider carries the pinions 20 which mesh with the pinions 6 and 12 in the housing of the drum 10. Suitable packing glands 21 are placed at the points where the shaft 1 and the hollow shaft 3 pass through the housing. A pulley 22 is fastened to one end of the shaft 1. The drums 9 and 10 are provided with the usual brake bands 23.

From the foregoing it will be seen that when the pulley 5 is connected with a suitable source of power and the bands or drum 9 contracted to prevent movement of said drum 9, the pinion 12, which is connected with the drum 9, is held stationary so that the rotary movement of the pulley 5 and the hollow shaft 3 will be communicated through the pinion 7, the pinions 16, the spider 15 to the shaft 1, as the pinions 16 travel around the pinion 12. Of course, the casing 14 will rotate with the spider. Thus the shaft 1 is driven in a forward direction at half the speed of the pulley 5. The drum 10, with its associated parts, rotate as a unit with the shaft 1 as the pinion 12 of this drum 10 is keyed to the shaft, as shown at 12'. By releasing the band of drum 9 and contracting the band on drum 10, the spider 19, associated with the drum 10, is held stationary so that the movement of the hollow shaft and its pinion 6 will cause the pinions 20 to rotate on their axes while their spider remains stationary and thus these pinions 20 will cause the gear 12 to rotate at the same speed as the gear or pinion 6 and thus the shaft 1 will be driven at the same speed as the pulley 5, though in a reverse direction. Thus it will be seen that I have provided simple means for rotating the shaft 1 at half speed in one direction and at full speed in the opposite direction.

It will, of course, be understood that the power can be applied to the pulley 22 and the pulley 5 used as the take-off pulley, but the operation will be the same.

The parts are lubricated by placing lubricant in the casings.

By allowing the brake bands to slip on the drums, different speeds can be secured, as will be understood, so that the invention provides a variable clutch and transmission.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. Transmission means of the class described comprising a shaft, means for rotatably suporting the shaft, a pair of brake drums rotatably mounted on the shaft, a pinion on the shaft connected with one of the drums, a second pinion on the shaft loosely associated with the other drum and fastened to the shaft, a hollow shaft rotatably mounted on the first shaft, a pinion at each end of the hollow shaft, these pinions being of the same size and oppositely arranged to the first mentioned pinions, planetary gearing keyed to the first shaft and meshing with one of the pinions of the hollow shaft and with the pinion which is connected with its drum, planetary gearing meshing with the other pinion of the hollow shaft and with the pinion which is keyed to the first shaft, means for applying power to one shaft and take-off means connected with the other shaft.

2. Transmission means of the class described comprising a shaft, means for rotatably supporting the shaft, a pair of brake drums rotatably mounted on the shaft, a pinion on the shaft connected with one of the drums, a second pinion on the shaft loosely associated with the other drum and fastened to the shaft, a hollow shaft rotatably mounted on the first shaft, a pinion at each end of the hollow shaft, these pinions being of the same size and oppositely arranged to the first mentioned pinions, planetary gearing keyed to the first shaft and meshing with one of the pinions of the hollow shaft and with the pinion which is connected with its drum, planetary gearing meshing with the other pinion of the hollow shaft and with the pinion which is keyed to the first shaft, means for applying power to one shaft, take-off means connected with the other shaft and a housing connected with each drum and enclosing the pinions and planetary gearing associated with said drum.

In testimony whereof I affix my signature.

BENJAMIN O. WARD.